United States Patent [19]

Hayashi

[11] Patent Number: 5,800,066
[45] Date of Patent: Sep. 1, 1998

[54] MECHANICAL ASSEMBLY OF SHAFT AND STATIC PRESSURE BEARING

[75] Inventor: Takashi Hayashi, Kawasaki, Japan

[73] Assignee: Kuroda Seiko Co., Ltd., Kawasaki, Japan

[21] Appl. No.: 840,719

[22] Filed: Apr. 25, 1997

[30] Foreign Application Priority Data

Apr. 30, 1996 [JP] Japan ................. 8-134338

[51] Int. Cl.$^6$ ............................ F16C 32/06
[52] U.S. Cl. ............ 384/100; 384/114; 384/121; 384/902
[58] Field of Search ............ 384/100, 114, 384/118, 121, 902

[56] References Cited

U.S. PATENT DOCUMENTS

| | | | |
|---|---|---|---|
| 3,744,858 | 7/1973 | Weichsel | 384/100 X |
| 4,715,731 | 12/1987 | Tittizer | 384/100 |
| 4,838,710 | 6/1989 | Ohta et al. | 384/100 |
| 5,098,205 | 3/1992 | Zehndbauer et al. | 384/121 X |

Primary Examiner—Thomas R. Hannon
Attorney, Agent, or Firm—Varndell Legal Group

[57] ABSTRACT

A mechanical assembly of shaft and static pressure bearing including a static pressure bearing mechanism formed in a shaft. The bearing mechanism includes an air supply chamber, a plurality of air conduits, a plurality of porous bodies each secured in a respective one of the plurality of air conduits, a glass layer applied on outer surfaces of the porous bodies as well as on an end face of the shaft, a plurality of pockets formed in the glass layer at positions corresponding to the air conduits, and a plurality of orifices formed in each of the plurality of pockets such that a gap formed between the glass layer and a bearing main body is communicated with the air supply chamber by the pockets, orifices and porous bodies. The pockets and orifices can be formed simultaneously by a laser machining. A distribution in pressure within a gap formed between the glass layer and a bearing main body can be uniform.

9 Claims, 4 Drawing Sheets

5,800,066

1

MECHANICAL ASSEMBLY OF SHAFT AND STATIC PRESSURE BEARING

BACKGROUND OF THE INVENTION

1. Field of the Invention

The present invention relates to a mechanical assembly including a shaft and a static pressure bearing for supporting the shaft in a non-contact manner by injecting a compressed air into a gap or space formed between the bearing and the shaft through a restriction. Such a mechanical assembly of shaft and static pressure bearing has been widely used in precision machine tools, semiconductor manufacturing machines and various kinds of mechanical elements.

2. Related Art Statement

In order to improve a performance of the mechanical assembly of shaft and static pressure bearing, it is necessary to make a gap between the bearing and the shaft as small as possible and to make a pressure distribution within said gap as uniform as possible. Particularly, a required rigidity of the bearing is largely dependent upon a size of the gap between the bearing and the shaft. Furthermore, it is required to make a flow rate of the air injected into said gap as small as possible so that the uniform or flat pressure distribution is attained within the gap. In the assembly of shaft and static pressure bearing, orifice restriction without pocket, orifice restriction with pocket, porous material restriction and others are used in accordance with an application.

FIG. 1 is a cross sectional view showing a known mechanical assembly of shaft and static pressure bearing having an orifice restriction. Such a mechanical assembly of shaft and static pressure bearing is described in Japanese Patent Application Laid-open Publication Kokai Hei 3-213718. A gap G is formed between a shaft 1 and a bearing main body 2. In an end face of the bearing main body 2, there are formed an orifice restriction 3 and a pocket 4 which is communicated with the restriction. In FIG. 1, there is also shown a pressure distribution within the gap G. In this known mechanical assembly of shaft and static pressure bearing, a pressure within the gap G is kept substantially constant to a pressure Pn, is slightly increased at position corresponding to an output of the orifice restriction 3, and is decreased at edges of the pocket 4 to an atmospheric pressure Pa.

In the known mechanical assembly of shaft and static pressure bearing illustrated in FIG. 1, when a depth of the gap G is reduced to a value not larger than 4 µ in order to improve a rigidity of the bearing, it is necessary to reduce a diameter of the orifice restriction 3 not larger than 100 µm. However, such a small orifice restriction could not be manufactured easily. The rigidity of the bearing may be improved also by increasing an area of the gap G. However, in such a case, a volume of the gap G is increased, and thus a damping property of the bearing is deteriorated and an operation might become unstable.

FIG. 2 shows another known mechanical assembly of shaft and static pressure bearing including the porous material restriction. Such a mechanical assembly is described in, for instance, Japanese Patent Application Laid-open Publications Kokai Sho 63-186030 and Kokai Hei 6-307448. In this known mechanical assembly, a gap G is formed between a shaft 1 and a bearing main body 2. In a surface of the bearing main body 2, there is formed an air conduit 6 and a porous material restriction 7 is provided in the air conduit. As depicted in FIG. 2, a pressure within the gap G is kept substantially constant to a value Pn and is decreased to an atmospheric pressure Pa at both edges of the gap G.

2

In the known mechanical assembly of shaft and static pressure bearing depicted in FIG. 2, the porous material restriction 7 can be easily made of ceramics, and thus a decrease in pressure within the gap G can be limited and a high rigidity can be obtained. However, it is very difficult to maintain an aperture size of porous material restriction 7 uniform, so that a flow rate of a compressed air could not be made uniform.

In order to mitigate the above mentioned drawbacks of the known mechanical assembly of shaft and static pressure bearing shown in FIG. 1, a depth of the pocket 4 is set to a suitable value. That is to say, as illustrated in FIG. 3, a gap G is formed between a shaft 1 and a bearing main body 8, and an orifice restriction 9 and a shallow pocket 10 are formed in the bearing main body 8. Then, a pressure within the gap G is gradually decreased from a value Pn at a center to a value Pn' at edges of the pocket 10. Then, a pressure is further decreased to an atmospheric pressure Pa at regions outside the pocket 10. In this manner, a pressure within the gap G can be kept much more uniformly than that shown in FIG. 1. However, when an area of the pocket 10 is increased for improving the rigidity of the bearing, an inclination of the pressure within the gap G becomes large, and thus the rigidity of the bearing could not be increased.

It should be noted that in the mechanical assemblies shown in FIGS. 1-3, the pocket and restriction are formed in the bearing main body, but they may be formed in the surface of shaft.

SUMMARY OF THE INVENTION

The present invention has for its object to provide a novel and useful mechanical assembly of shaft and static pressure bearing, in which the above mentioned problems can be solved and a uniform pressure distribution within the gap between the shaft and the bearing main body can be attained easily and precisely.

According to the invention, a mechanical assembly of shaft and static pressure bearing comprising a shaft, a bearing main body for supporting said shaft movably, and a static pressure bearing mechanism formed in one of said shaft and bearing main body and including at least one air conduit into which a compressed air is supplied, at least one orifice communicated with said air conduit for restricting a flow rate of a compressed air stream, and at least one pocket communicated with said orifice for spreading the compressed air stream flowing from said orifice, characterized in that a porous material is inserted into said air conduit, an outer surface of said porous material is sealed by a sealing member, at least one pocket is formed in an outer surface of said sealing member, and a plurality of orifices are formed in said pocket.

DESCRIPTION OF THE PREFERRED EMBODIMENT

Figure 1:
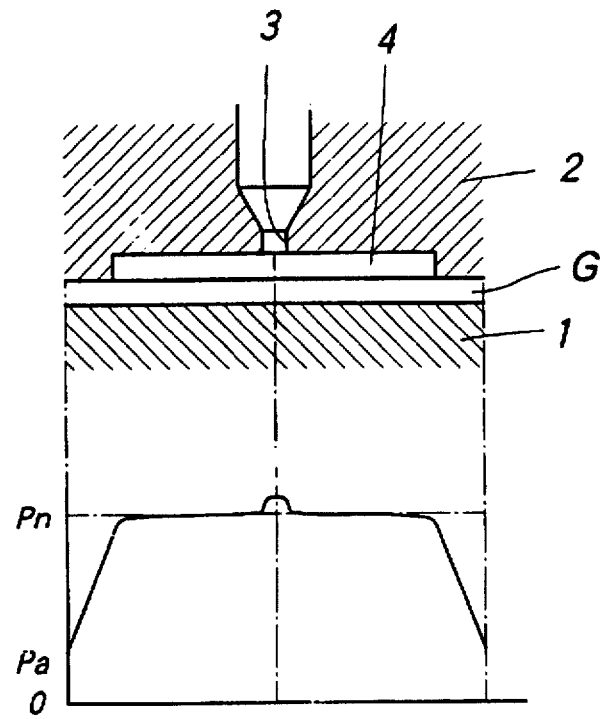
FIG. 1 is a cross sectional view showing a known mechanical assembly of shaft and static pressure bearing.
Figure 2:
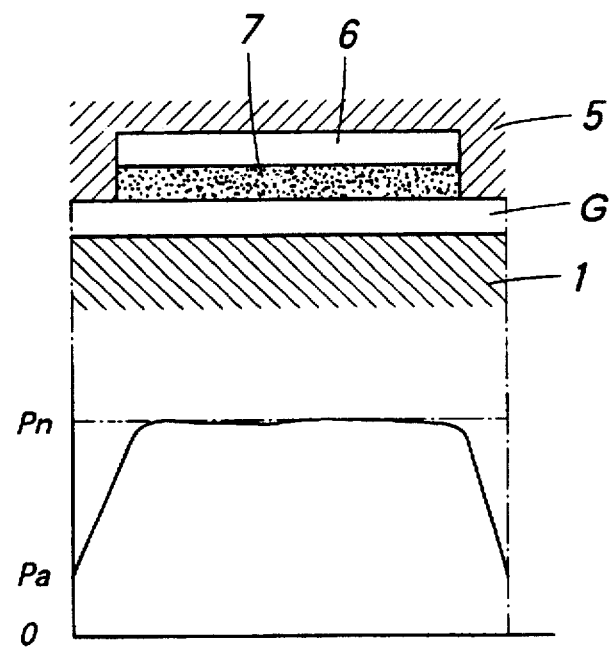
FIG. 2 is a cross sectional view illustrating another known mechanical assembly of shaft and static pressure bearing.
Figure 3:
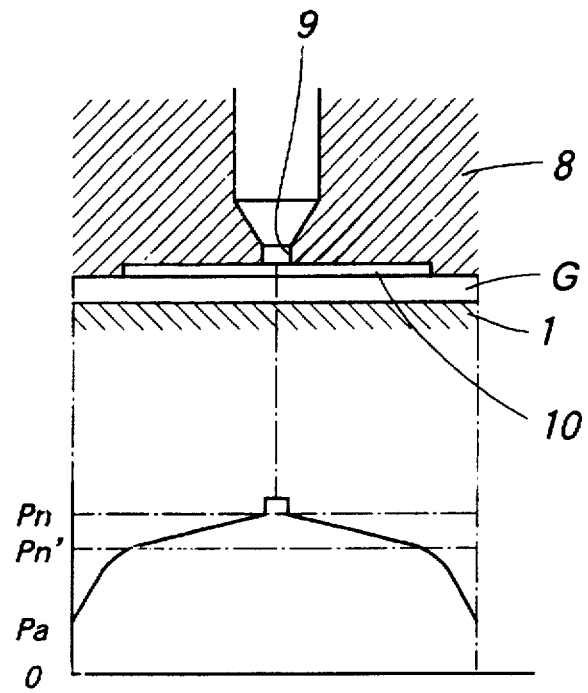
FIG. 3 is a cross sectional view depicting still another known mechanical assembly of shaft and static pressure bearing.
Figure 4:
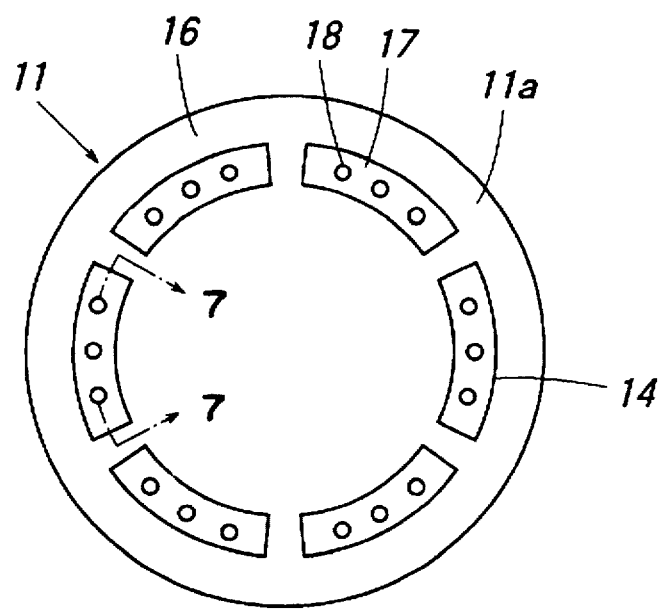
FIG. 4 is a plan view showing an end face of a shaft of an embodiment of the mechanical assembly of shaft and static pressure bearing according to the invention.
Figure 5:
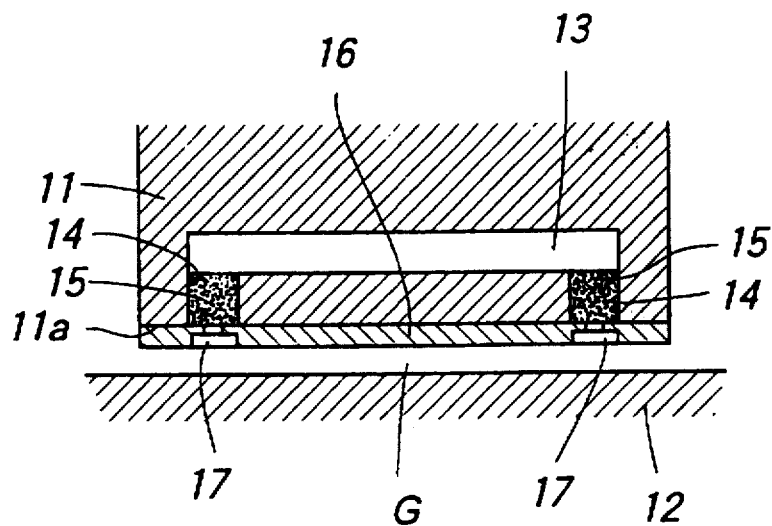
FIG. 5 is a cross sectional view of the shaft shown in FIG. 4.
Figure 6:
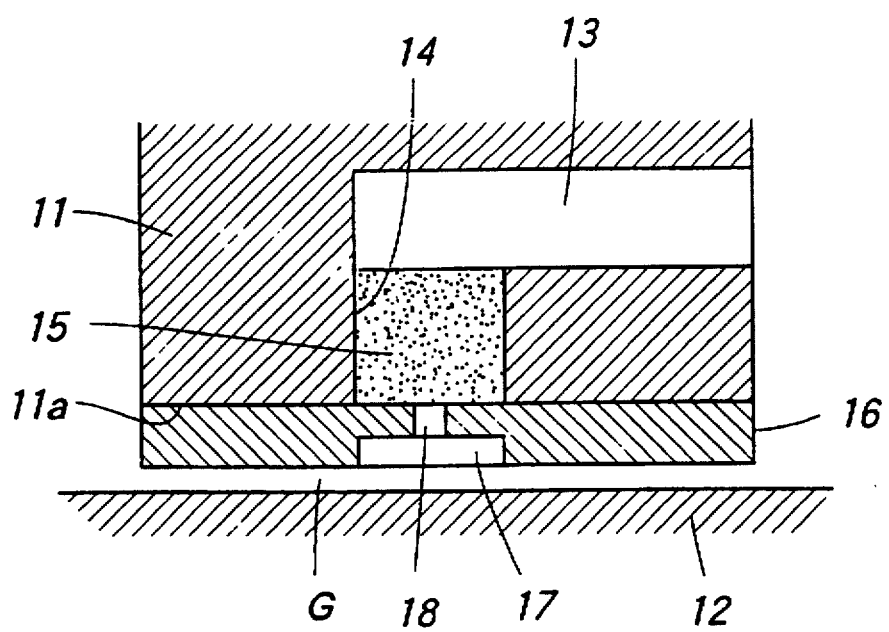
FIG. 6 is an enlarged cross sectional view of a portion of the shaft illustrated in FIG. 5.

FIG. 4 is a plan view showing an end face of a shaft 11 of an embodiment of the mechanical assembly of shaft and static pressure bearing according to the invention, FIG. 5 is a longitudinal cross sectional view of the shaft, and FIG. 6 is an enlarged view of a portion of the shaft. As shown in FIG. 5, the shaft 11 is supported by a bearing main body 12 and a small gap G is formed between the shaft 11 and the bearing main body 12. In the present embodiment, the main portion of the static pressure bearing is formed in the shaft 11. However, according to the invention, the main portion of the static pressure bearing may be formed in the bearing main body 12.

The shaft 11 is made of ceramics and has formed therein an air supply chamber 13 near an end face 11a. In the end face 11a of the shaft 11, there are formed a plurality of air conduits 14 which are communicated with the air supply chamber 13. In the present embodiment, six air conduits 14 are formed. As clearly shown in FIG. 4, the six air conduits 14 are arranged equidistantly along a circle which is concentric with the shaft 11.

Porous bodies 15 are inserted into the air conduits 14 and a glass layer 16 serving as a sealing member is provided on the end face 11a such that the porous bodies 15 are sealed by the glass layer. The glass layer 16 may be formed by coating. The porous material 15 has a sufficient porosity such that a compressed air from the air supply chamber 13 can be effectively passed and has a sufficient rigidity such that the glass layer 16 is not deformed by a variation of the air pressure within the gap G formed between an outer surface of the glass layer 16 and the bearing main body 12. The porous bodies 15 have to be firmly secured to the air conduits 14.

In the glass layer 16, there are formed six pockets 17 at positions corresponding to the air conduits 14. The pocket 17 have the same configuration as the air conduit 14. Moreover, in a bottom of each pockets 17, there are formed three orifices 18 which extend up to the porous bodies 15. The orifices 18 are aligned along a circle equidistantly as clearly shown in FIG. 4. The pockets 17 and orifices 18 can be easily and precisely formed by a laser machining. A diameter of the orifice 18 is not larger than 100 µm.

A compressed air introduced into the air supply chamber 13 can easily pass through the porous bodies 15 having a high porosity, is restricted by the orifices 18 to a given flow rate, and is then injected into the pockets 17. Therefore, a pressure in the gap G between the glass layer 16 and the bearing main body 12 is increased. After that, the air flows to the outside atmosphere. In this manner, according to the invention, the porous bodies 15 perform two functions, i.e. a function for flowing the compressed air from the air supply chamber 13 to the orifices 18 and a function for preventing the glass layer 16 from being deformed.

Figure 7:
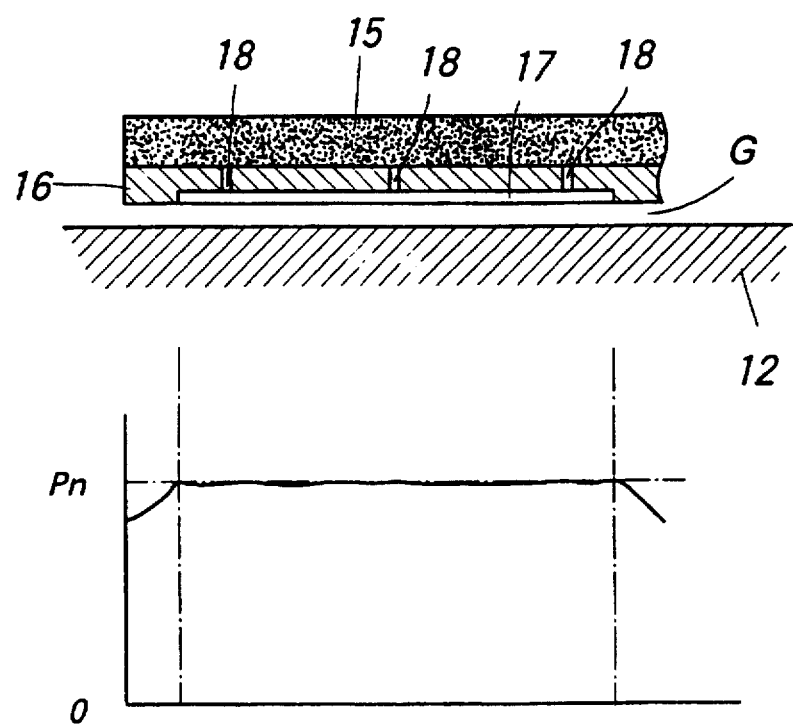
FIG. 7 is a cross sectional view cut along a curved line 7—7 in FIG. 4.

FIG. 7 is a cross sectional view cut along an arcade line A—A in FIG. 4 and a pressure distribution within the gap G between the glass layer 16 and the bearing main body 12.

As stated above, in the present embodiment, the pockets 17 and orifices 18 can be formed by the same laser machine tool in a single process step, and thus the mechanical assembly can be manufactured efficiently. Further, since a plurality of orifices 18 are formed in a single pocket 17, a circumferential length of the pocket can be elongated. Therefore, even if diameters of the orifices 18 are varied, the pressure distribution within the gap G can be maintained uniform, so that the rigidity and load capacity of the mechanical assembly can be improved.

In the present embodiment, since the shaft 11 is made of ceramics, the glass layer 16 can be easily and firmly provided on the end face of the shaft by the coating. However, according to the invention, when the shaft 11 is made of another material than ceramics, the sealing member can be formed by plating a metal such as nickel or by cementing a ceramic sheet by means of a suitable adhesive. Moreover, the pockets and orifices may be formed by an electric spark machine.

In the above embodiment, the mechanical assembly of shaft and static pressure bearing is constructed as the thrust bearing assembly, but according to the invention, the bearing assembly may be constructed as other type bearing such as journal or radial bearing mechanical assembly and air-way bearing mechanical assembly.

In the above explained embodiment, the static pressure bearing mechanism is formed in the end portion of the shaft, but according to the invention, the static pressure bearing mechanism may be formed in the bearing main body.

As explained above in detail, in the mechanical assembly of shaft and static pressure bearing according to the invention, the porous material is inserted into the air conduit, the sealing member is provided on the porous material, and the pocket and a plurality of the orifices are formed in the sealing member. Therefore, the pocket and orifices can be simultaneously formed by means of the laser machine tool and electric spark machine. In this manner, the performance of the manufacturing process can be improved. Moreover, since a plurality of orifices are formed in a single sealing member, the pressure distribution within the gap between the shaft and the bearing main body can be kept uniform. By means of the laser machining, the orifice can be precisely formed to have a very small diameter, and thus the performance of the mechanical assembly of shaft and static pressure bearing according to the invention can be further improved.

What is claimed is:

1. A mechanical assembly of shaft and static pressure bearing comprising a shaft, a bearing main body for supporting said shaft movably, and a static pressure bearing mechanism formed in one of said shaft and bearing main body and including at least one air conduit into which a compressed air is supplied, an orifice communicated with said air conduit for restricting a flow rate of a compressed air stream, and a pocket communicated with said orifice for spreading the compressed air stream flowing from said orifice, wherein a porous material is inserted into said air conduit, an outer surface of said porous material is sealed by a sealing member, and said pocket is formed in an outer surface of said sealing member.

2. A mechanical assembly, according to claim 1, characterized in that said static pressure bearing mechanism is formed in said shaft made of ceramics and said sealing member is formed by a glass layer.

3. A mechanical assembly according to claim 2, characterized in that said glass layer is formed by coating.

4. A mechanical assembly according to claim 1, characterized in that said orifice is formed by a laser machining.

5. A mechanical assembly according to claim 4, characterized in that said pocket is formed by a laser machining.

6. A mechanical assembly according to claim 1, characterized in that a diameter of said orifice is not larger than 100 µm.

7. A mechanical assembly according to claim 1, wherein more than one said orifice is arranged in said pocket.

8. A mechanical assembly of shaft a static pressure bearing comprising a shaft, a bearing main body for movably supporting said shaft, and a static pressure bearing mechanism formed in one of said shaft and bearing main body; said static pressure bearing mechanism including an air supply chamber for supplying compressed air to an air pocket through an air conduit, said air conduit having a plurality of orifices communicating with said pocket and a porous material arranged between said plurality of orifices and said air supply chamber, a sealing member for sealing said porous material, said plurality of orifices restricting a flow rate of a compressed air stream, said air pocket spreading the compressed air stream from said plurality of orifices, and said pocket arranged in an outer surface of said sealing member.

9. A mechanical assembly of shaft a static pressure bearing comprising a shaft, a bearing main body for movably supporting said shaft, and a static pressure bearing mechanism formed in one of said shaft and bearing main body; said static pressure bearing mechanism including an air supply chamber for supplying compressed air to a plurality of air conduits formed in an end face of said shaft and aligned equidistantly along a circle concentric with said shaft, each said air conduit communicating with a respective air pocket, each said air pocket communicating with said air chamber through a plurality of orifices and a porous material arranged in a respective said air conduit, each said air pocket formed on a outer surface of a sealing member which seals said porous material, each said plurality of orifices restricting a flow rate of a compressed air stream, and each said air pocket spreading the compressed air stream from a respective said plurality of orifices.

* * * * *